US012146527B2

(12) United States Patent
Kameyama et al.

(10) Patent No.: US 12,146,527 B2
(45) Date of Patent: Nov. 19, 2024

(54) BEARING PAD AND BEARING DEVICE

(71) Applicant: MITSUBISHI HEAVY INDUSTRIES, LTD., Tokyo (JP)

(72) Inventors: Yuki Kameyama, Tokyo (JP); Takuzo Shigihara, Tokyo (JP); Chihiro Yoshimine, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 41 days.

(21) Appl. No.: 18/034,791

(22) PCT Filed: Oct. 20, 2021

(86) PCT No.: PCT/JP2021/038683
§ 371 (c)(1),
(2) Date: May 1, 2023

(87) PCT Pub. No.: WO2022/113576
PCT Pub. Date: Jun. 2, 2022

(65) Prior Publication Data
US 2023/0407917 A1  Dec. 21, 2023

(30) Foreign Application Priority Data

Nov. 26, 2020  (JP) ................. 2020-195800

(51) Int. Cl.
*F16C 17/03* (2006.01)
*F16C 32/06* (2006.01)
(Continued)

(52) U.S. Cl.
CPC ............ *F16C 33/108* (2013.01); *F16C 17/03* (2013.01); *F16C 32/0666* (2013.01); *F16C 33/1045* (2013.01); *F16C 37/002* (2013.01)

(58) Field of Classification Search
CPC .... F16C 17/03; F16C 17/035; F16C 32/0666; F16C 33/1045; F16C 33/1055; F16C 33/1065; F16C 33/108; F16C 37/002
See application file for complete search history.

(56) References Cited

U.S. PATENT DOCUMENTS 8,834,032 B2 *  9/2014  Suzuki ................... F16C 17/03
                                                384/322
9,759,257 B2 *  9/2017  Sano .................... F16C 33/1065
(Continued)

FOREIGN PATENT DOCUMENTS

DE  202009014649 U1 *  4/2010  ............ F16C 17/045
JP  2006-112499 A  4/2006
(Continued)

OTHER PUBLICATIONS

International Search Report in corresponding International Application No. PCT/JP2021/038683, dated Dec. 21, 2021 (4 pages).
(Continued)

*Primary Examiner* — Phillip A Johnson
(74) *Attorney, Agent, or Firm* — Osha Bergman Watanabe & Burton LLP

(57) ABSTRACT

A bearing pad that supports a rotating shaft rotating about an axis includes: a pad body having a hollow portion formed therein, a lubricating oil supply path for supplying a lubricating oil to the hollow portion, and a lubricating oil discharge path for discharging the lubricating oil to an outside from the hollow portion; and a support structure that is packed into the hollow portion and radially connects inner wall surfaces forming the hollow portion while including a space. The hollow portion is formed in a region shifted to a forward side in a rotation direction of the rotating shaft in the pad body.

9 Claims, 8 Drawing Sheets

(51) Int. Cl.
    *F16C 33/10*     (2006.01)
    *F16C 37/00*     (2006.01)

(56) References Cited

U.S. PATENT DOCUMENTS

2016/0169275 A1    6/2016   Sato et al.
2017/0321754 A1   11/2017   Wang et al.

FOREIGN PATENT DOCUMENTS

| | | |
|---|---|---|
| JP | 2013-234746 A | 11/2013 |
| JP | 2014145453 A | 8/2014 |
| JP | 2016-011698 A | 1/2016 |
| JP | 2016109269 A | 6/2016 |
| JP | 2019-519707 A | 7/2019 |

OTHER PUBLICATIONS

Written Opinion in corresponding International Application No. PCT/JP2021/038683, dated Dec. 21, 2021 (8 pages).

\* cited by examiner

BEARING PAD AND BEARING DEVICE

TECHNICAL FIELD

The present disclosure relates to a bearing pad and a bearing device. Priority is claimed on Japanese Patent Application No. 2020-195800, filed on Nov. 26, 2020, the content of which is incorporated herein by reference.

BACKGROUND ART

A rotary machine including, for example, a gas turbine and a centrifugal compressor includes a rotor which is a rotating body rotating about an axis and a casing which is a stationary body surrounding the rotor from an outer peripheral side. Shaft ends of the rotor are rotatably supported by bearing devices. A journal bearing that supports a radial load and a thrust bearing that supports an axial load are widely used as such bearing devices. As a specific example of the journal bearing, a device described in Patent Document 1 described below is known. A tilting pad bearing according to Patent Document 1 described below includes a plurality of bearing pads that are in sliding contact with an outer peripheral surface of a rotor via an oil film (lubricating oil), and a housing that supports the bearing pads from an outer peripheral side.

Here, during operation of the rotary machine, since shear heat is generated in the oil film between the outer peripheral surface of the rotor and the bearing pads, the bearing pads tend to reach a high temperature. When the bearing pads reach a high temperature, performance as a bearing device is affected. Therefore, in Patent Document 1 described below, a configuration is adopted in which a lubricating oil flow path (pad internal hole) is formed inside the bearing pad such that part of the lubricating oil flows from a pad surface to the inside of the bearing pad. Thus, a cooling effect on the bearing pads is obtained.

CITATION LIST

Patent Document

Patent Document 1
Japanese Unexamined Patent Application, First Publication No. 2016-011698

SUMMARY OF INVENTION

Technical Problem

However, there is a possibility that a sufficient cooling effect cannot be obtained only by forming the flow path inside the bearing pad as in Patent Document 1 described above.

The present disclosure has been made to solve the above problem, and an object thereof is to provide a bearing pad and a bearing device having a higher cooling effect.

Solution to Problem

In order to achieve the aforementioned object, a bearing pad according to the present disclosure supports a rotating shaft that rotates about an axis and includes a pad body having a hollow portion formed therein, a lubricating oil supply path for supplying a lubricating oil to the hollow portion, and a lubricating oil discharge path for discharging the lubricating oil to an outside from the hollow portion; and a support structure that is packed into the hollow portion and radially connects inner wall surfaces forming the hollow portion while including a space.

Advantageous Effects of Invention

According to the present disclosure, it is possible to provide a bearing pad and a bearing device having a higher cooling effect.

DESCRIPTION OF EMBODIMENTS

First Embodiment (Configuration of Bearing Device)

Figure 1:
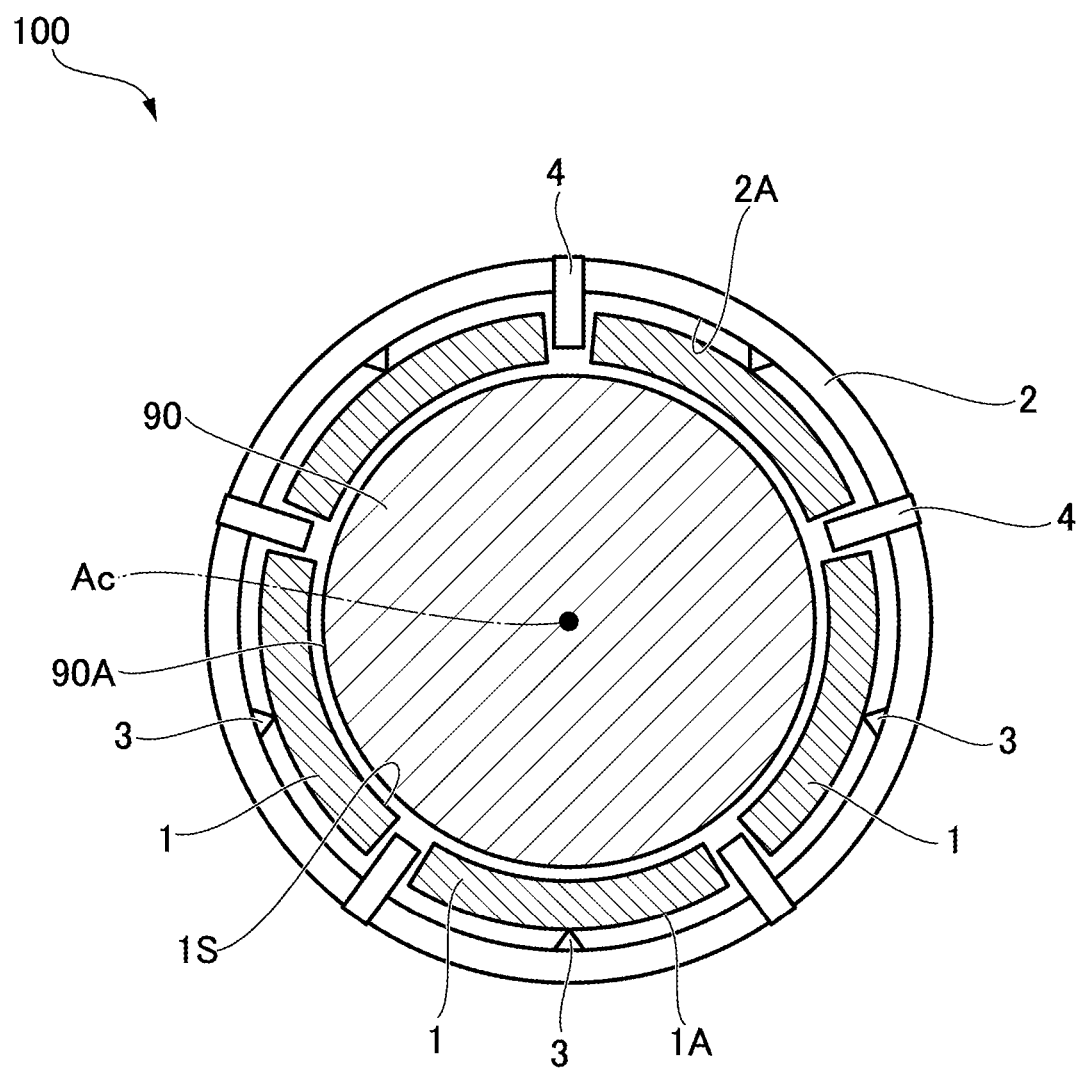
FIG. 1 is a cross-sectional view showing a configuration of a bearing device according to a first embodiment of the present disclosure.

A bearing device 100 according to a first embodiment of the present disclosure will be described below with reference to FIGS. 1 to 8. The bearing device 100 is a tilting pad bearing for rotatably supporting a rotating shaft 90 of a rotary machine including, for example, a gas turbine and a compressor. As shown in FIG. 1, the bearing device 100 includes a bearing pad 1, a housing 2, a pivot 3 and a nozzle 4.

A plurality of (for example, five) bearing pads 1 are provided at intervals in a circumferential direction along an outer peripheral surface (rotating shaft outer peripheral surface 90A) of a rotating shaft 90 having a circular cross section centered on an axis Ac. Each bearing pad 1 has a cross-sectional shape curved in the circumferential direction when viewed from a direction of the axis Ac.

A sliding surface 1S, which is a surface facing an inner peripheral side of the bearing pad 1, faces the rotating shaft outer peripheral surface 90A with a gap therebetween. The sliding surface 1S is curved so as to be convex outward in a radial direction about the axis Ac. A radius of curvature of the sliding surface 1S is set to be the same as or slightly larger than a radius of curvature of the rotating shaft outer peripheral surface 90A. A lubricating oil supplied from a nozzle 4 (described later) is interposed as an oil film between the sliding surface 1S and the rotating shaft outer peripheral surface 90A.

A pad outer peripheral surface 1A, which is a surface facing an outer peripheral side of the bearing pad 1, is curved so as to be convex outward in the radial direction about the axis Ac. A central portion in a circumferential direction of the pad outer peripheral surface 1A abuts on a pivot 3 (described later).

The housing 2 has a tubular shape covering the plurality of bearing pads 1 from the outer peripheral side. The housing 2 is provided with a plurality of the nozzles 4 arranged at intervals in the circumferential direction. The nozzle 4 supplies a lubricating oil supplied from the outside to a space inside the housing 2. The nozzle 4 is provided between a pair of the bearing pads 1 adjacent to each other in the circumferential direction.

Furthermore, a plurality of the pivots 3 arranged at intervals in the circumferential direction are provided on an inner peripheral surface (housing inner peripheral surface 2A) of the housing 2. A top portion of the pivot 3 is in point contact with the pad outer peripheral surface 1A. That is, the pivot 3 swingably supports the bearing pad 1.

(Detailed Configuration of Bearing Pad)

Figure 2:
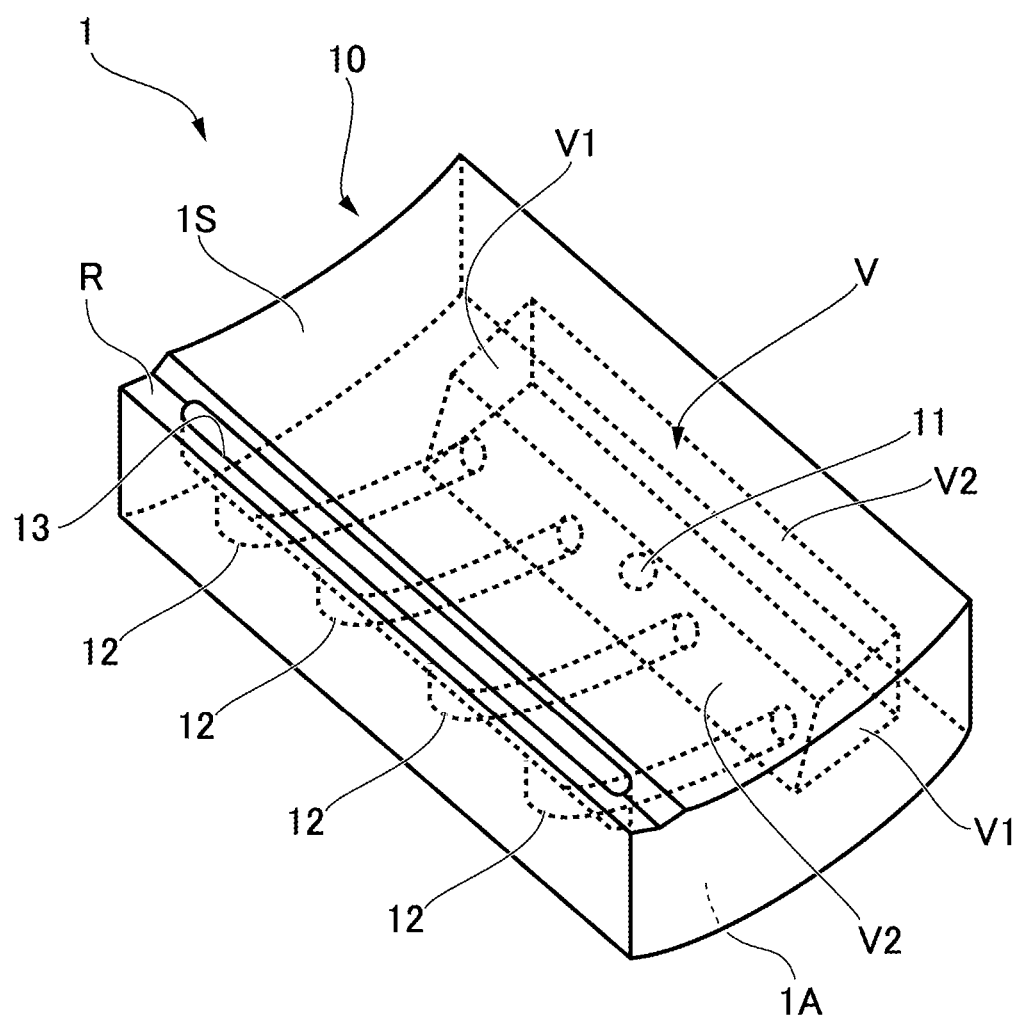
FIG. 2 is a perspective view showing a configuration of a bearing pad according to the first embodiment of the present disclosure.
Figure 3:
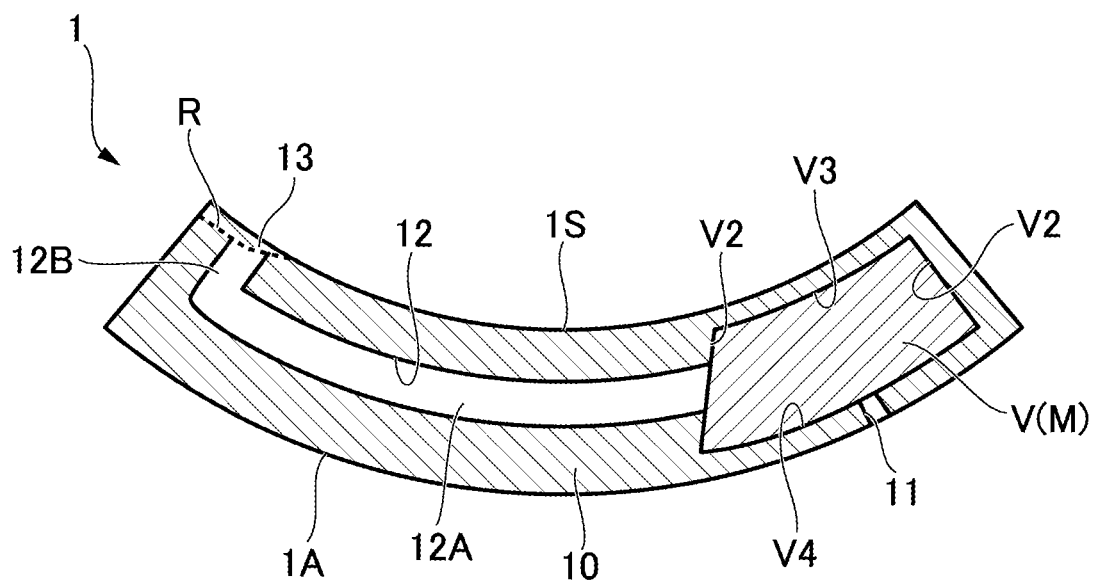
FIG. 3 is a cross-sectional view showing the configuration of the bearing pad according to the first embodiment of the present disclosure.

Next, a detailed configuration of the bearing pad 1 will be described with reference to FIGS. 2 and 3. As shown in FIG. 2, the bearing pad 1 has a pad body 10 and a support structure M. The pad body 10 is a member forming an outer shape of the bearing pad 1, and the sliding surface 1S and the pad outer peripheral surface 1A which are described above are formed thereon. The pad body 10 has a hollow portion V, a lubricating oil supply path 11, and a lubricating oil discharge path 12.

The hollow portion V is a space formed inside the pad body 10. The hollow portion V is formed only in a region shifted to one side in the circumferential direction. In other words, the hollow portion V is formed on a forward side in a rotation direction of the rotating shaft 90 (that is, a side to which the rotating shaft 90 rotates: a downstream side in a flow direction of the lubricating oil). More specifically, the hollow portion V is formed within a range of ¼ to ½ of a circumferential length of the pad body 10 from an end portion on the forward side in the rotation direction (downstream side). More desirably, the hollow portion V is formed in a region of ⅓ of the circumferential length from the end portion on the forward side in the rotation direction.

The hollow portion V is formed by six inner wall surfaces. Specifically, the hollow portion V includes a pair of first end surfaces V1 facing in the direction of the axis Ac, a pair of second end surfaces V2 facing in the circumferential direction, a top surface V3 (see FIG. 3) on an inner side in the radial direction, and a bottom surface V4 on an outer side in the radial direction (see FIG. 3). When viewed from the radial direction, the length of the first end surface V1 is set to be smaller than the length of the second end surface V2. That is, the hollow portion V has a rectangular cross-sectional shape with long sides extending in the direction of the axis Ac.

One end of the lubricating oil supply path 11 is open to the bottom surface V4 of the inner wall surface. The lubricating oil supply path 11 is a radially extending flow path. The other end of the lubricating oil supply path 11 is open to the pad outer peripheral surface 1A. Furthermore, one ends of a plurality of (for example, four) lubricating oil discharge paths 12 are opened to the second end surface V2 on a rearward side in the rotation direction of the pair of second end surfaces V2. The lubricating oil discharge paths 12 are arranged at intervals in the direction of the axis Ac. As shown in FIG. 3, each of the lubricating oil discharge paths 12 includes a circumferential flow path 12A extending in the circumferential direction and a radial flow path 12B extending radially inward from an end portion on the rearward side in the rotation direction of the circumferential flow path 12A.

A radially inner end portion of the radial flow path 12B is connected to a lubricating oil outlet 13 formed in the sliding surface 1S. The lubricating oil outlet 13 is an elongated hole extending in the direction of the axis Ac. The lubricating oil outlet 13 is formed at a position slightly spaced forward from an end portion of the sliding surface 1S on the rearward side in the rotation direction. Furthermore, a cutout R that is recessed radially inward and extends in the direction of the axis Ac is formed in the region of the sliding surface 1S. The lubricating oil outlet 13 is open into the cutout R.

(Configuration of Support Structure)

Figure 4:
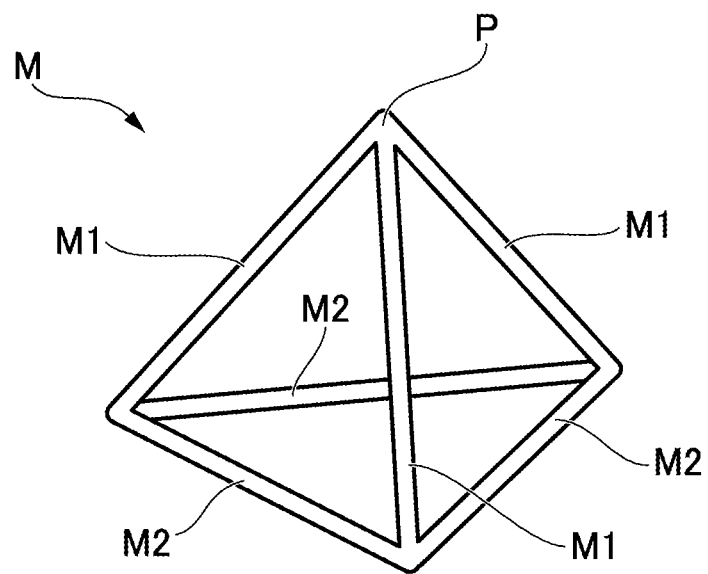
FIG. 4 is a perspective view showing a configuration of a lattice structure as a support structure according to the first embodiment of the present disclosure.

The support structure M is packed into the hollow portion V. The support structure M has a lattice structure. The lattice structure is a three-dimensional structure that can bear a radial load in the hollow portion V while including a space therein. The support structure M according to the present embodiment is formed by arranging a plurality of unit structures along the inner wall surface of the hollow portion V. More specifically, as shown in FIG. 4, the unit structure of the support structure M includes three columnar portions M1 extending in the radial direction, of which one ends are connected to each other at a vertex P, and three connection portions M2 connecting the other ends of the columnar portions M1 to each other. That is, the unit structure is composed only of sides of a tetrahedron.

Figure 5:
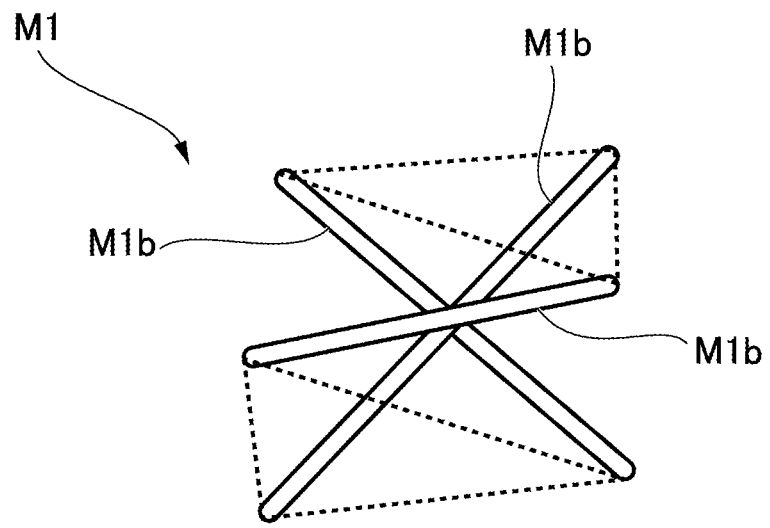
FIG. 5 is a perspective view showing another example of the lattice structure of the support structure according to the first embodiment of the present disclosure.
Figure 6:
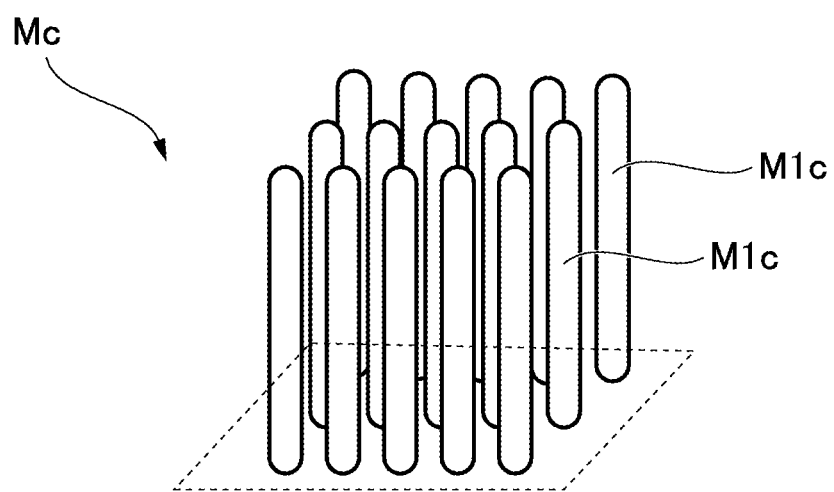
FIG. 6 is a perspective view showing a configuration of a pin structure as the support structure according to the first embodiment of the present disclosure.
Figure 7:
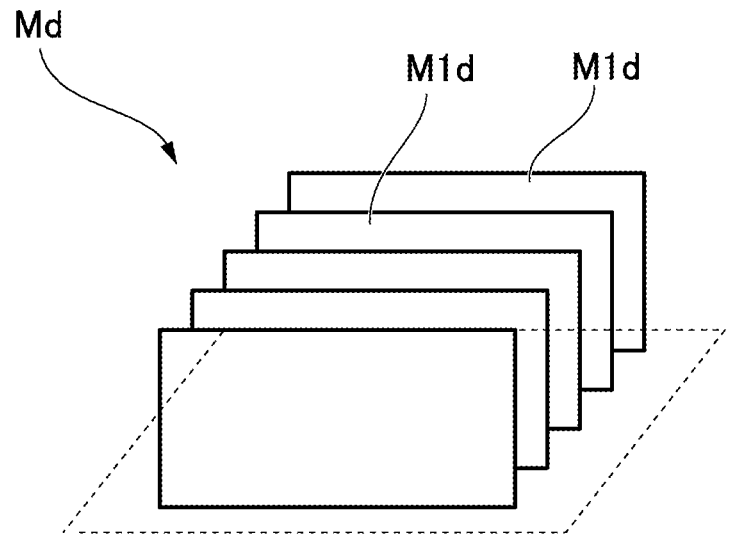
FIG. 7 is a perspective view showing a configuration of a fin structure as the support structure according to the first embodiment of the present disclosure.

As other examples of the unit structure that constitutes the support structure M, shapes shown in FIGS. 5 to 7 can be adopted. In an example of FIG. 5, a unit structure of a support structure Mb is formed by three crossing columnar portions M1b. A triangular projection plane is formed on a plane by end portions of the three columnar portions M1b. In an example of FIG. 6, a support structure Mc is formed by arranging a plurality of pins M1c extending in the radial direction. In an example of FIG. 7, a support structure Md is formed by arranging a plurality of fins M1d extending in the radial direction. Although not shown in detail, it is also possible to form the support structure M using a three-dimensional structure called a porous lattice structure.

(Internal Configuration of Hollow Portion)

Figure 8:
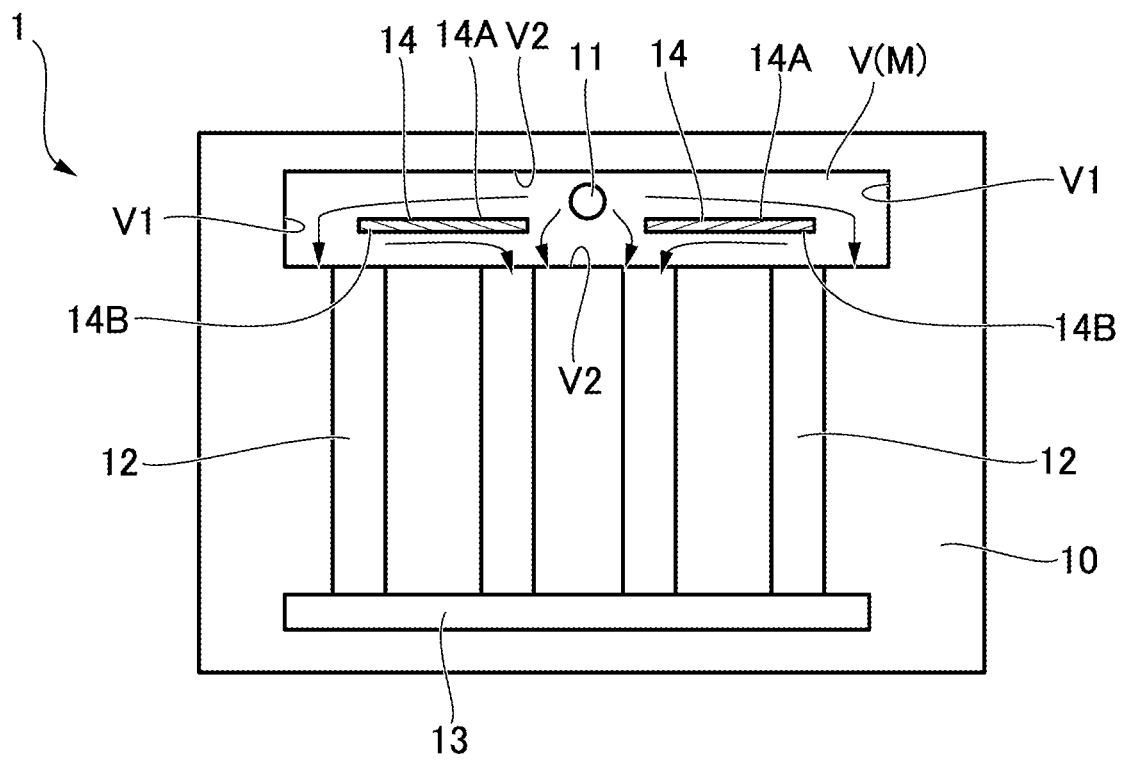
FIG. 8 is a perspective view of the bearing pad according to the first embodiment of the present disclosure as viewed from a radially inner side.

Next, an internal configuration of the hollow portion V will be described with reference to FIG. 8. It should be noted that the support structure M is not shown in the figure for simplification of representation. As shown in the figure, a plurality of (for example, two) partition plates 14 are provided inside the hollow portion V. The partition plates 14 are arranged at intervals in the direction of the axis Ac. Each partition plate 14 expands along a plane defined by the radial direction and the direction of the axis Ac within the hollow portion V. One surface of the partition plate 14 in a thickness direction (surface facing the rearward side in the rotation direction of the rotating shaft 90) is a facing surface 14A facing an outlet of the lubricating oil supply path 11. In other words, the partition plates 14 are located on the rearward side with respect to the outlet of the lubricating oil supply path 11 in the rotation direction of the rotating shaft 90. Moreover, in the direction of the axis Ac, the partition plate 14 and the outlet of the lubricating oil supply path 11 are formed at positions that do not overlap each other. The surface (back surface 14B) of the partition plate 14 facing away from the facing surface 14A faces an inlet of the lubricating oil discharge path 12.

(Operation and Effect)

Next, an operation of the bearing device 100 according to the present embodiment will be described. When the rotating shaft 90 rotates, a thin oil film is formed by the lubricating oil supplied from the nozzle 4 between the sliding surface 1S of the bearing pad 1 and the rotating shaft outer peripheral surface 90A. The interposition of the oil film reduces a frictional resistance between the rotating shaft outer peripheral surface 90A and the sliding surface 1S. As a result, the bearing pad 1 supports a radial load of the rotating shaft 90 in a state in which the rotating shaft 90 is smoothly rotated.

Here, during the operation of the rotary machine, since shear heat is generated in the oil film between the rotating shaft outer peripheral surface 90A and the sliding surface 1S, the bearing pad 1 tends to reach a high temperature. When the temperature of the bearing pad 1 becomes high, performance of the bearing device 100 is affected. In the present embodiment, the hollow portion V is formed inside the bearing pad 1, and the support structure M is packed into the hollow portion V as described above.

According to the above configuration, the lubricating oil flows through the space of the support structure M packed into the hollow portion V, so that the heat generated in the pad body 10 is transferred to the lubricating oil. Thus, unlike a case where the pad body 10 is formed solid, cooling can be performed from the inside of the pad body 10 as well as the outside of the pad body 10. Therefore, it is possible to cool the pad body 10 more efficiently. Furthermore, since the support structure M connects the inner wall surfaces of the hollow portion V in the radial direction, a decrease in rigidity of the pad body 10 can be suppressed compared to, for example, a case where no structure is provided inside the hollow portion V. On the other hand, in a case where the support structure M is not provided, there is a possibility that load performance of the bearing pad 1 will be impaired due to the decrease in rigidity by the formation of the hollow portion V. According to the above configuration, such a possibility can be reduced.

Furthermore, according to the above configuration, since a plurality of lattice structures are arranged as the support structure M, a load applied to the inner wall surface of the hollow portion V can be dispersed over a wide range, and the load can be borne more stably. In addition, since the lubricating oil flows through the space formed inside the support structure M, a contact area between the lubricating oil and the support structure M increases. Thus, a heat transfer rate between the lubricating oil and the pad body 10 is increased, so that a high cooling effect for the pad body 10 can be obtained.

Further, according to the above configuration, since the plurality of lubricating oil discharge paths 12 are formed at intervals in the direction of the axis Ac, the lubricating oil can be smoothly discharged from the hollow portion V in a wider range in the direction of the axis Ac.

Furthermore, according to the above configuration, a flow of the lubricating oil collides with the partition plate 14 provided inside the hollow portion V, so that the flow is dispersed along the facing surface of the partition plate 14. More specifically, as indicated by arrows in FIG. 8, the lubricating oil flows from the lubricating oil supply path 11 into the hollow portion V and then spreads to both sides in the direction of the axis Ac along the facing surface 14A. The flow is divided into a component that moves toward the center in the direction of the axis Ac along the back surface 14B and a component that continues to flow to both sides in the direction of the axis Ac. Thus, the lubricating oil can stably spread over a wider range in the hollow portion V. As a result, the cooling effect of the lubricating oil can be exhibited evenly over an entire region of the hollow portion V.

In addition, according to the above configuration, the hollow portion V is formed to be shifted to a region on the forward side in the rotation direction where the heat generation of the lubricating oil due to the rotation of the rotating shaft 90 is significant. As a result, the cooling effect of the lubricating oil can be positively applied to the region on the forward side. In addition, a decrease in rigidity due to the formation of the hollow portion V can be minimized compared to a case where the hollow portion V is formed in an entire circumferential region of the bearing pad 1.

The first embodiment of the present disclosure has been described above. Various changes and modifications can be made to the above configuration without departing from the scope of the present disclosure. For example, the number of the bearing pads 1 is not limited to five and may be four or less or six or more depending on the design and specifications. The number of the nozzles 4 can be similarly changed.

Second Embodiment

Subsequently, a bearing pad 1b according to a second embodiment of the present disclosure will be described with reference to FIG. 9. In addition, the same configurations as in the first embodiment described above are denoted by the same reference signs, and detailed descriptions thereof will not be repeated.

Figure 9:
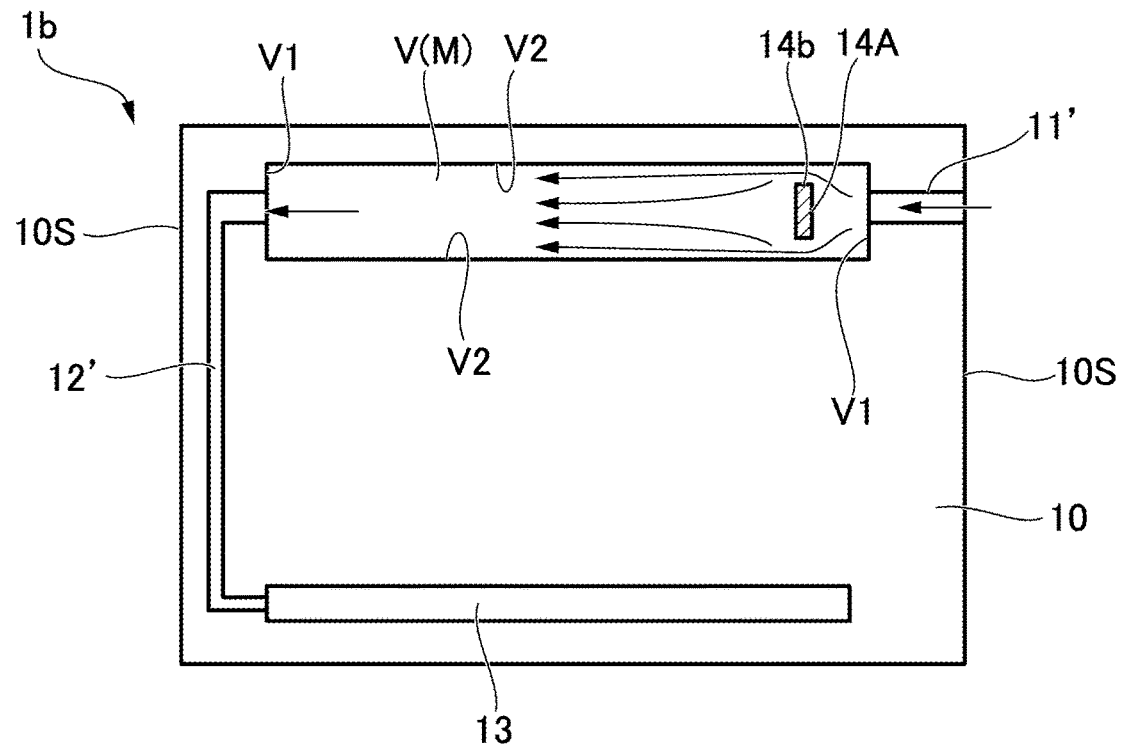
FIG. 9 is a perspective view of a bearing pad according to a second embodiment of the present disclosure as viewed from a radially inner side.

As shown in FIG. 9, in the present embodiment, configurations of a lubricating oil supply path 11' and a lubricating oil discharge path 12' are different from those of the first embodiment. One end of the lubricating oil supply path 11' is open to a side surface 10S of the pad body 10 (that is, an end surface facing the direction of the axis Ac). The other end of the lubricating oil supply path 11' is open to one first end surface V1 of the hollow portion V. That is, the lubricating oil supply path 11' extends in the direction of the axis Ac. The lubricating oil discharge path 12' extends in a C-shape from the other first end surface V1, which is different from the first end surface V1 to which the lubricating oil supply path 11' is connected, to the lubricating oil outlet 13.

Furthermore, a partition plate 14b is provided inside the hollow portion V. The partition plate 14b has a plate shape with a long side extending in the circumferential direction when viewed from the radial direction. A surface on one side in a thickness direction of the partition plate 14b is a facing surface 14A that faces an outlet of the lubricating oil supply path 11'. Only one partition plate 14b is provided at a position shifted toward the lubricating oil supply path 11' in the direction of the axis Ac. Further, a gap is formed between a circumferential end portion of the partition plate 14b and the second end surface V2.

According to the above configuration, the lubricating oil supply path 11' and the lubricating oil discharge path 12' are open to the first end surface V1, which has a small dimension when viewed in the radial direction, out of the end surfaces of the hollow portion V. Thus, a flow path cross-sectional area becomes small compared to, for example, a case where the lubricating oil flows between the second end surfaces V2 having large dimensions. As a result, a flow velocity of the lubricating oil in the hollow portion V increases. Therefore, the cooling effect of the pad body 10 by the lubricating oil can be further enhanced.

Furthermore, in the above configuration, the partition plate 14b is provided inside the hollow portion V. The lubricating oil that has flowed into the hollow portion V through the lubricating oil supply path 11' is dispersed in the circumferential direction by colliding with the partition plate 14b (arrows in FIG. 9). Thus, the lubricating oil spreads widely on a downstream side of the partition plate 14b. As a result, the cooling effect of the lubricating oil can be exhibited evenly within the hollow portion V.

Figure 10:
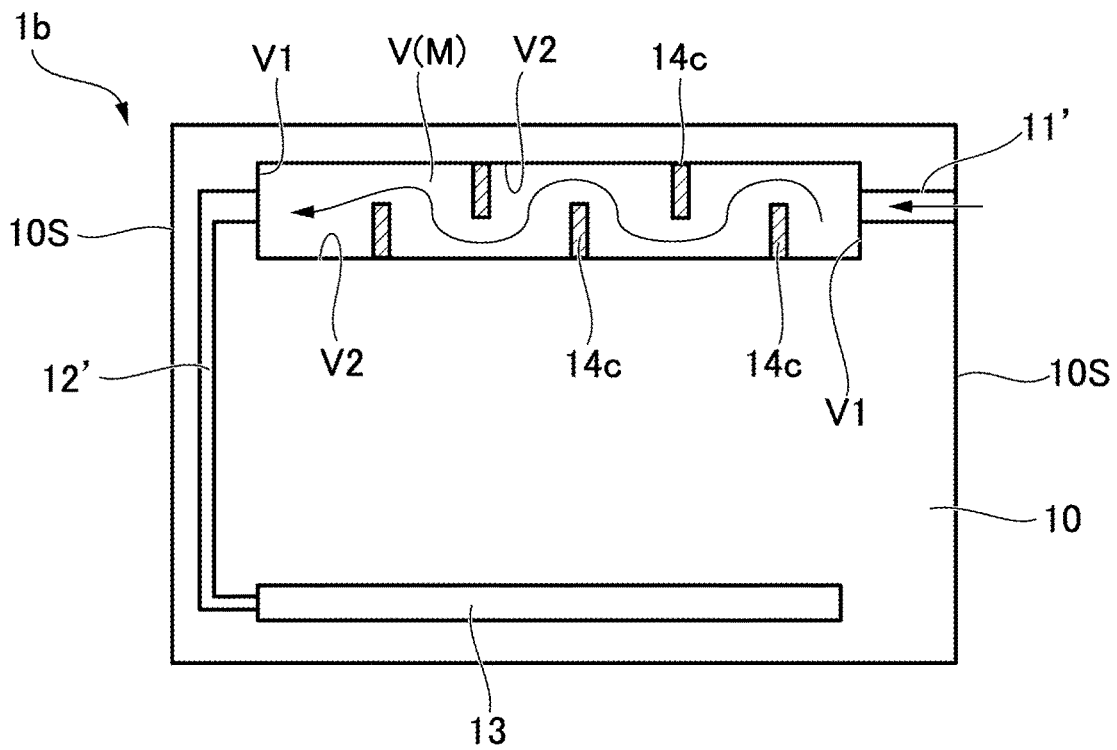
FIG. 10 is a perspective view showing a modification example of the bearing pad according to the second embodiment of the present disclosure.

The second embodiment of the present disclosure has been described above. Various changes and modifications can be made to the above configuration without departing from the scope of the present disclosure. For example, it is possible to adopt a configuration shown in FIG. 10 as a modification example of the second embodiment. In a bearing pad 1c according to this modification example, a plurality of partition plates 14c are arranged in the hollow portion V at intervals in a first direction which is the direction of the axis Ac. The partition plates 14c have positions different from each other in a second direction (that is, the circumferential direction) perpendicular to the first direction. In other words, the partition plates 14c are arranged alternately in the circumferential direction. Thus, a zigzag flow path is formed in the hollow portion V. Therefore, similarly to the configuration according to the second embodiment, the lubricating oil can spread over a wider range in the hollow portion V.

Third Embodiment

Figure 11:
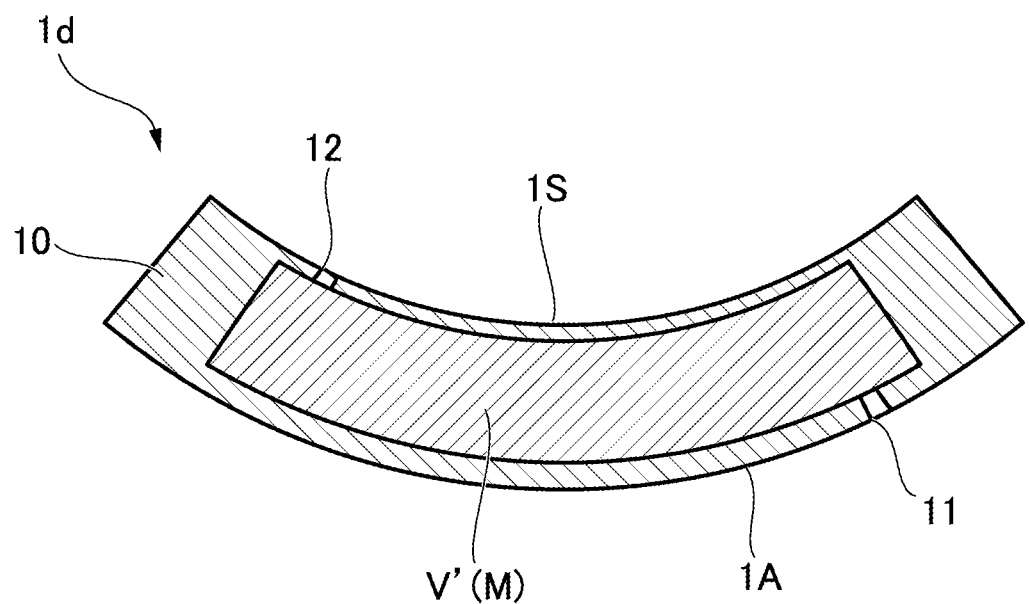
FIG. 11 is a cross-sectional view showing a configuration of a bearing pad according to a third embodiment of the present disclosure.
Figure 12:
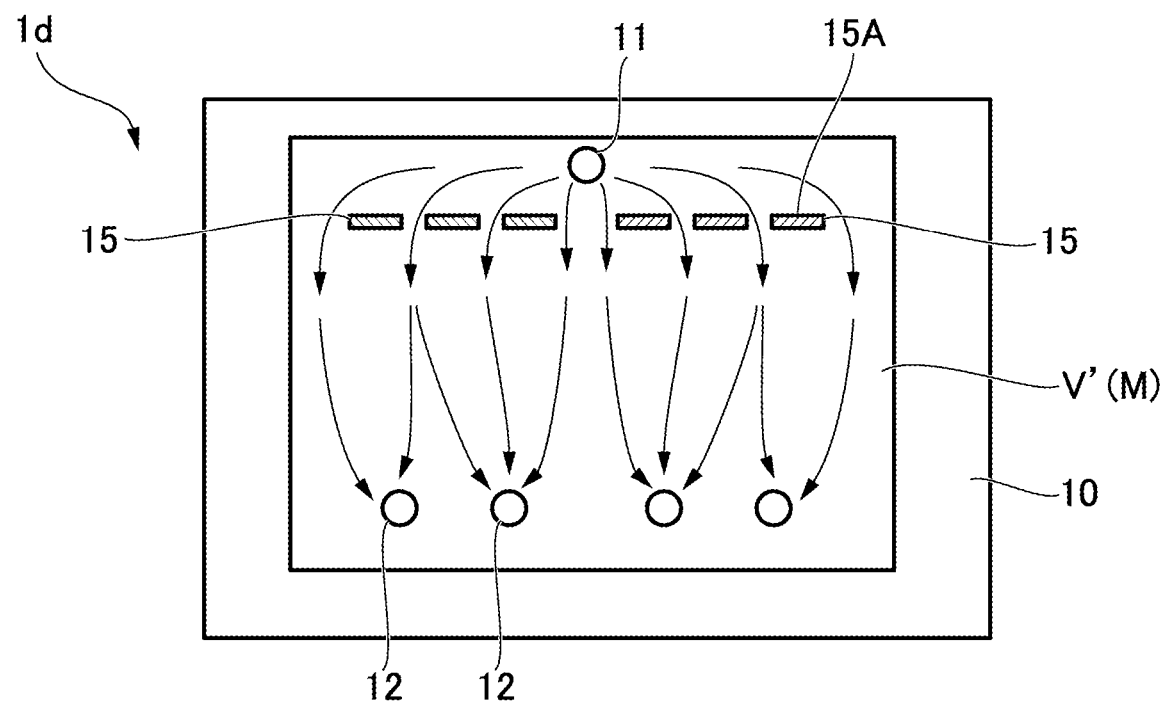
FIG. 12 is a perspective view of the bearing pad according to the third embodiment of the present disclosure as viewed from a radially inner side.

Next, a bearing pad 1d according to a third embodiment of the present disclosure will be described with reference to FIGS. 11 and 12. In addition, the same configurations as in each of the embodiments described above are denoted by the same reference signs, and detailed descriptions thereof will not be repeated. As shown in FIG. 11, in the present embodiment, a configuration of the hollow portion V' is different from each of the embodiments described above. The hollow portion V' is formed over the entire circumferential region of the pad body 10. Here, "formed over the entire circumferential region" refers to a configuration in which the inside of the pad body 10 is hollow while leaving a minimum thickness at both circumferential end portions of the pad body 10.

An outlet of the lubricating oil supply path 11 is open on the forward side in the rotation direction of the rotating shaft 90 in the hollow portion V'. The outlet is arranged in a central portion in the direction of the axis Ac. Inlets of a plurality of (for example, four) lubricating oil discharge paths 12 are open on the rearward side in the rotation direction. The inlets are arranged at intervals in the direction of the axis Ac.

A plurality of (for example, six) partition plates 15 are provided inside the hollow portion V'. The partition plates 15 are located on the rearward side in the rotation direction with respect to the outlet of the lubricating oil supply path 11. The partition plate 15 has a plate shape with a long side extending in the direction of the axis Ac when viewed from the radial direction. Moreover, the partition plates 15 are arranged at intervals in the direction of the axis Ac. A surface on one side in a thickness direction of the partition plate 15 is a facing surface 15A that faces the outlet of the lubricating oil supply path 11.

According to the above configuration, the hollow portion V' is formed over the entire circumferential region of the pad body 10. Thus, the cooling effect of the lubricating oil can be obtained more stably in the entire circumferential region of the pad body 10. Further, since the support structure M is packed into the hollow portion V as in each of the embodiments described above, a decrease in rigidity of the pad body 10 due to the formation of the hollow portion V' can be minimized.

Furthermore, in the above configuration, the partition plate 15 is provided inside the hollow portion V'. The lubricating oil that has flowed into the hollow portion V through the lubricating oil supply path 11 collides with the partition plate 15 and is dispersed in the direction of the axis line Ac (arrows in FIG. 12). Thus, the lubricating oil spreads widely on a downstream side of the partition plate 15. As a result, the cooling effect of the lubricating oil can be exhibited evenly within the hollow portion V'.

Figure 13:
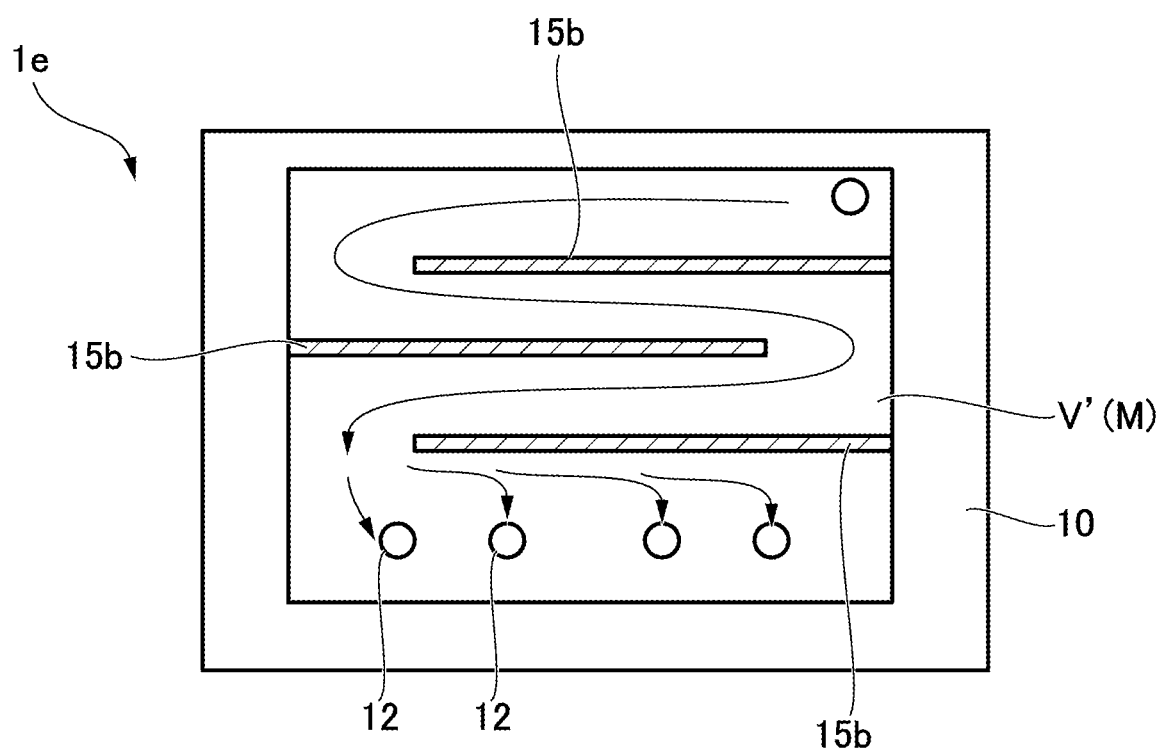
FIG. 13 is a perspective view showing a modification example of the bearing pad according to the third embodiment of the present disclosure.

The third embodiment of the present disclosure has been described above. Various changes and modifications can be made to the above configuration without departing from the scope of the present disclosure. For example, it is possible to adopt a configuration shown in FIG. 13 as a modification example of the third embodiment. In a bearing pad 1e according to this modification example, a plurality of partition plates are arranged in the hollow portion V at intervals in a first direction which is the circumferential direction. The partition plates 15b have positions different from each other in a second direction (that is, the direction of the axis Ac) perpendicular to the first direction. In other words, the partition plates 15b are arranged alternately in the direction of the axis Ac. Thus, a zigzag flow path is formed in the hollow portion V'. Therefore, similarly to the configuration according to the third embodiment, the lubricating oil can spread over a wider range in the hollow portion V'.

Further, as a modification example common to the first to third embodiments described above, it is possible to change the position where the outlet of the lubricating oil supply path 11 is formed. Specifically, the outlet of the lubricating oil supply path can be formed on any surface of the pad body 10 other than the sliding surface 1S. The position is appropriately set according to the design and specifications.

Appendix

The bearing pad 1 and the bearing device 100 described in each embodiment are understood, for example, as follows.

(1) A bearing pad 1 according to a first aspect supports a rotating shaft 90 that rotates about an axis Ac and includes a pad body 10 having a hollow portion V formed therein, a lubricating oil supply path 11 for supplying a lubricating oil to the hollow portion V, and a lubricating oil discharge path 12 for discharging the lubricating oil to an outside from the hollow portion V; and a support structure M that is packed into the hollow portion V and radially connects inner wall surfaces forming the hollow portion V while including a space.

According to the above configuration, the lubricating oil flows through the space of the support structure M packed into the hollow portion V, so that the heat generated in the pad body 10 propagates to the lubricating oil. Thus, it is possible to efficiently cool the pad body 10. Furthermore, since the support structure M connects the inner wall surfaces of the hollow portion V in the radial direction, a decrease in rigidity of the pad body 10 can be suppressed compared to, for example, a case where no structure is provided inside the hollow portion V.

(2) In the bearing pad 1 according to a second aspect, the support structure M may include a plurality of lattice structures that have at least a columnar portion M1 extending in a radial direction and that are arranged along the inner wall surface.

According to the above configuration, a load applied to the inner wall surface can be stably borne by arranging the plurality of lattice structures. Furthermore, since the lubricating oil flows through the space formed inside the lattice structure so that the heat transfer rate between the lubricating oil and the pad body 10 is increased, a high cooling effect for the pad body 10 can be obtained.

(3) In the bearing pad 1 according to a third aspect, the support structure Mc may include a plurality of pins M1c extending in a radial direction and arranged at intervals along the inner wall surface.

According to the above configuration, the load applied to the inner wall surface can be stably borne by the plurality of pins M1c. Furthermore, since the lubricating oil flows through the spaces between the pins M1c so that the heat transfer rate between the lubricating oil and the pad body 10 is increased, a high cooling effect for the pad body 10 can be obtained.

(4) In the bearing pad 1 according to a fourth aspect, the support structure Md may include a plurality of fins M1d extending in a radial direction and arranged at intervals along the inner wall surface.

According to the above configuration, the load applied to the inner wall surface can be stably borne by the plurality of fins M1d. Furthermore, since the lubricating oil flows through the spaces between the fins M1d so that the heat transfer rate between the lubricating oil and the pad body 10 is increased, a high cooling effect for the pad body 10 can be obtained.

(5) In the bearing pad 1 according to a fifth aspect, a plurality of the lubricating oil discharge paths 12 may be formed at intervals in a direction of the axis Ac.

According to the above configuration, since the plurality of lubricating oil discharge paths 12 are formed at intervals in the direction of the axis Ac, the lubricating oil can be smoothly discharged from the hollow portion V in a wider range in the direction of the axis Ac.

(6) In the bearing pad 1b according to a sixth aspect, the hollow portion V may be formed in a region shifted to a forward side in a rotation direction of the rotating shaft in the pad body 10 so that a dimension of a first end surface V1 extending in a circumferential direction when viewed from a radial direction may be set to be smaller than a dimension of a second end surface V2 extending in a direction of the axis Ac, and each of the lubricating oil supply path 11' and the lubricating oil discharge path 12' may be open to the first end surface V1 of the hollow portion V.

According to the above configuration, the lubricating oil supply path 11' and the lubricating oil discharge path 12' are open to the first end surface V1, which has a small dimension when viewed in the radial direction, out of the end surfaces of the hollow portion V. Thus, a flow path cross-sectional area becomes small compared to, for example, a case where the lubricating oil flows between the second end surfaces V2 having large dimensions. As a result, a flow velocity of the lubricating oil in the hollow portion V increases. Therefore, the cooling effect of the pad body 10 by the lubricating oil can be further enhanced.

(7) The bearing pad 1 according to a seventh aspect may further include a partition plate 14 provided inside the hollow portion V and having a facing surface 14A facing an outlet side of the lubricating oil supply path.

According to the above configuration, a flow of the lubricating oil collides with the partition plate 14, so that the flow is dispersed along the facing surface 14A of the partition plate 14. Thus, the lubricating oil can spread over a wider range in the hollow portion V.

(8) In the bearing pad 1c according to an eighth aspect, a plurality of the partition plates 14c may be arranged at intervals in a first direction from the lubricating oil supply path 11' side to the lubricating oil discharge path 12' side and may be alternately arranged in a second direction perpendicular to the first direction.

According to the above configuration, a zigzag flow path is formed inside the hollow portion V by the partition plate 14c. Thus, the lubricating oil can spread over a wider range in the hollow portion V.

(9) In the bearing pad 1 according to a ninth aspect, the hollow portion V may be formed in a region shifted to a forward side in a rotation direction of the rotating shaft 90 in the pad body 10.

According to the above configuration, the hollow portion V is formed in a region on the forward side where the heat generation of the lubricating oil due to the rotation of the rotating shaft 90 is significant. As a result, the cooling effect of the lubricating oil can be positively applied to the region on the forward side.

(10) In the bearing pad 1d according to a tenth aspect, the hollow portion V' may be formed over an entire circumferential region in the pad body 10.

According to the above configuration, the cooling effect of the lubricating oil can be obtained more stably in the entire circumferential region in the pad body 10.

(11) A bearing device 100 according to an eleventh aspect includes a plurality of bearing pads 1 arranged in a circumferential direction, a housing 2 that covers the bearing pads 1 from an outer peripheral side, and pivots 3 provided on an inner peripheral surface of the housing 2 and each supporting the bearing pad 1.

According to the above configuration, it is possible to provide the bearing device 100 in which a decrease in rigidity is minimized while realizing a high cooling effect.

INDUSTRIAL APPLICABILITY

According to the present disclosure, it is possible to provide a bearing pad and a bearing device having a higher cooling effect.

REFERENCE SIGNS LIST

100: Bearing device
90: Rotating shaft
90A: Rotating shaft outer peripheral surface
1, 1b, 1c, 1d, 1e: Bearing pad
1A: Pad outer peripheral surface 1S: Sliding surface
2: Housing
2A: Housing inner peripheral surface
3: Pivot
4: Nozzle
10: Pad body
10S: Side surface
11, 11': Lubricating oil supply path
12, 12': Lubricating oil discharge path
12A: Circumferential flow path
12B: Radial flow path
13: Lubricating oil outlet
14, 14b, 14c, 15, 15b: Partition plate
14A, 15A: Facing surface
14B: Back surface
Ac: Axis
M, Mb, Mc, Md: Support structure
M1, M1b: Columnar portion
M1c: Pin
M1d: Fin
M2: Connection portion
P: Vertex
R: Cutout
V, V': Hollow portion
V1: First end surface
V2: Second end surface
V3: Top surface
V4: Bottom surface

What is claimed is:

1. A bearing pad that supports a rotating shaft rotating about an axis, comprising:
    a pad body having a hollow portion formed therein, at least one lubricating oil supply path for supplying a lubricating oil to the hollow portion, and a lubricating oil discharge path for discharging the lubricating oil to an outside from the hollow portion; and
    a support structure that is packed into the hollow portion and radially connects inner wall surfaces forming the hollow portion while including a space, wherein
    the hollow portion is formed in a region shifted to a forward side in a rotation direction of the rotating shaft in the pad body.

2. The bearing pad according to claim 1, wherein the support structure includes a plurality of lattice structures that have at least a columnar portion extending in a radial direction and that are arranged along one of the inner wall surfaces.

3. The bearing pad according to claim 1, wherein the support structure includes a plurality of pins extending in a radial direction and arranged at intervals along one of the inner wall surfaces.

4. The bearing pad according to claim 1, wherein the support structure includes a plurality of fins extending in a radial direction and arranged at intervals along one of the inner wall surfaces.

5. The bearing pad according to claim 1, wherein a plurality of lubricating oil discharge paths are formed at intervals in a direction of the axis.

6. The bearing pad according to claim 1, wherein
    a dimension of a first end surface extending in a circumferential direction when viewed from a radial direction is set to be smaller than a dimension of a second end surface extending in a direction of the axis, and
    each of the lubricating oil supply path and the lubricating oil discharge path is open to the first end surface of the hollow portion.

7. The bearing pad according to claim 1, further comprising at least one partition plate provided inside the hollow portion and having a facing surface facing an outlet side of the lubricating oil supply path.

8. The bearing pad according to claim 7, wherein a plurality of partition plates are arranged at intervals in a first direction from a lubricating oil supply path side toward a lubricating oil discharge path side and are alternately arranged in a second direction perpendicular to the first direction.

9. A bearing device comprising:
    a plurality of bearing pads according to claim 1 arranged in a circumferential direction;
    a housing that covers the bearing pads from an outer peripheral side; and
    pivots provided on an inner peripheral surface of the housing and each pivot supporting each bearing pad.

* * * * *